(12) United States Patent
Adams

(10) Patent No.: US 7,301,120 B2
(45) Date of Patent: Nov. 27, 2007

(54) ION FUSION FORMATION PROCESS INCLUDING PRECISE HEAT INPUT AND TEMPERATURE CONTROL

(75) Inventor: Robbie J. Adams, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 2 days.

(21) Appl. No.: 11/291,707

(22) Filed: Nov. 30, 2005

(65) Prior Publication Data

US 2007/0119826 A1   May 31, 2007

(51) Int. Cl.
*B23K 10/00* (2006.01)

(52) U.S. Cl. .............. 219/121.47; 219/76.16; 427/446

(58) Field of Classification Search .......... 219/121.47, 219/121.48, 76.16, 121.5, 121.52, 121.54, 219/121.57, 121.38, 121.37, 137.43; 427/446, 427/450, 452; 118/723 DC; 29/DIG. 39; 606/34

See application file for complete search history.

(56) References Cited

U.S. PATENT DOCUMENTS

| | | | |
|---|---|---|---|
| 2,847,958 A * | 8/1958 | Norton, Jr. et al. ........... 228/50 |
| 5,257,657 A | 11/1993 | Gore | |
| 5,340,433 A | 8/1994 | Crump | |
| 5,398,193 A | 3/1995 | deAngelis | |
| 5,510,066 A | 4/1996 | Fink et al. | |
| 5,555,176 A | 9/1996 | Menhennett et al. | |
| 5,633,021 A | 5/1997 | Brown et al. | |
| 5,900,207 A | 5/1999 | Danforth et al. | |
| 6,162,378 A | 12/2000 | Bedal et al. | |
| 6,253,116 B1 | 6/2001 | Zhang et al. | |
| 6,401,001 B1 | 6/2002 | Jang et al. | |
| 6,401,795 B1 | 6/2002 | Cesarano, III et al. | |
| 6,454,972 B1 | 9/2002 | Morisette et al. | |
| 6,565,558 B1 * | 5/2003 | Lindenmeier et al. ........ 606/34 |
| 6,660,209 B2 | 12/2003 | Leyden et al. | |
| 6,680,456 B2 | 1/2004 | Adams | |
| 6,792,326 B1 | 9/2004 | Duignan | |
| 2002/0111707 A1 | 8/2002 | Li et al. | |
| 2006/0266745 A1 * | 11/2006 | Bruce ................... 219/121.84 |

* cited by examiner

*Primary Examiner*—Quang Van
(74) *Attorney, Agent, or Firm*—Ingrassia Fisher & Lorenz

(57) ABSTRACT

An ion fusion formation method is used to manufacture a component from successive layers of feedstock material. A plasma stream is created by energizing a flowing gas using an arc electrode, the arc electrode having a variable magnitude current supplied thereto. The plasma stream is directed to a predetermined targeted region, and the feedstock material is introduced into the plasma stream to produce a pool of molten feedstock in the predetermined targeted region, the molten feedstock being produced at a temperature determined in part by parameters of the variable magnitude current. Prior to introducing the feedstock material into the plasma stream, optimal molten feedstock parameters may be determined for producing the layers of feedstock material. Feeding parameters by which the feedstock material will be introduced into the plasma stream are then adjusted in view of the determined optimal molten feedstock parameters.

16 Claims, 3 Drawing Sheets

ION FUSION FORMATION PROCESS INCLUDING PRECISE HEAT INPUT AND TEMPERATURE CONTROL

TECHNICAL FIELD

The present invention relates to the fabrication of parts and devices, and more particularly relates to solid free-form fabrication processes that create parts and devices by selectively applying feedstock material to a substrate or an in-process workpiece.

BACKGROUND

Solid free-form fabrication (SFF) is a designation for a group of processes that produce three dimensional shapes from additive formation steps. SFF does not implement any part-specific tooling. Instead, a three dimensional component is often produced from a graphical representation devised using computer-aided modeling (CAM). This computer representation may be, for example, a layer-by-layer slicing of the component shape into consecutive two dimensional layers, which can then be fed to control equipment to fabricate the part. Alternatively, the manufacturing process may be user controlled instead of computer controlled. Generally speaking, a component may be manufactured using SFF by successively building feedstock layers representing successive cross-sectional component slices. Although there are numerous SFF systems that use different components and feedstock materials to build a component, SFF systems can be broadly described as having an automated platform/positioner for receiving and supporting the feedstock layers during the manufacturing process, a feedstock supplying apparatus that directs the feedstock material to a predetermined region to build the feedstock layers, and an energy source directed toward the predetermined region. The energy from the energy source modifies the feedstock in a layer-by-layer fashion in the predetermined region to thereby manufacture the component as the successive layers are built onto each other.

One recent implementation of SFF is generally referred to as ion fusion formation (IFF). With IFF, a torch such as a plasma, gas tungsten arc, plasma arc welding, or other torch with a variable orifice is incorporated in conjunction with a stock feeding mechanism to direct molten feedstock to a targeted surface such as a base substrate or an in-process structure of previously-deposited feedstock. A component is built using IFF by applying small amounts of molten material only where needed in a plurality of deposition steps, resulting in net-shape or near-net-shape parts without the use of machining; molds, or mandrels. The deposition steps are typically performed in a layer-by-layer fashion wherein slices are taken through a three dimensional electronic model by a computer program. A positioner then directs the molten feedstock across each layer at a prescribed thickness.

One inherent challenge when building a component using an IFF process is establishing and maintaining a heat balance between the weld pool, the torch, and the substrate. IFF enables fabrication of nearly any net shape using metals, ceramics, or plastics as feedstock by controlling the freezing rate of the molten material. Liquid feedstock and/or substrate may flow away instead of providing additionally built-up structure if the weld pool does not quickly solidify. The molten continuous stream, or each molten droplet in a discontinuous stream, will add incremental shape for building a final component if solidification quickly occurs when the stream contacts the underlying substrate or component material.

Hence, there is a need for an IFF process that include a technique for improving heat input to the molten feedstock and/or temperature of the underlying component material when heated feedstock is deposited onto a targeted surface to build the component. There is a further need for a technique that can be implemented without adding major components to existing IFF systems.

BRIEF SUMMARY

The present invention provides an ion fusion formation method for manufacturing a component from successive layers of feedstock material, with each of the successive layers representing a cross-sectional component slice. A plasma stream is created by energizing a flowing gas using an arc electrode, the arc electrode having a variable magnitude current supplied thereto. The plasma stream is directed to a predetermined targeted region, and the feedstock material is introduced into the plasma stream to produce a pool of molten feedstock in the predetermined targeted region, the molten feedstock being produced at a temperature determined in part by parameters of the variable magnitude current.

The present invention also provides another ion fusion formation method in which, prior to introducing the feedstock material into the plasma stream, optimal molten feedstock parameters are determined for producing the layers of feedstock material. Feeding parameters by which the feedstock material will be introduced into the plasma stream are then adjusted in view of the determined optimal molten feedstock parameters so the molten feedstock being produced will have the determined optimal parameters.

Other independent features and advantages of the preferred apparatus and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
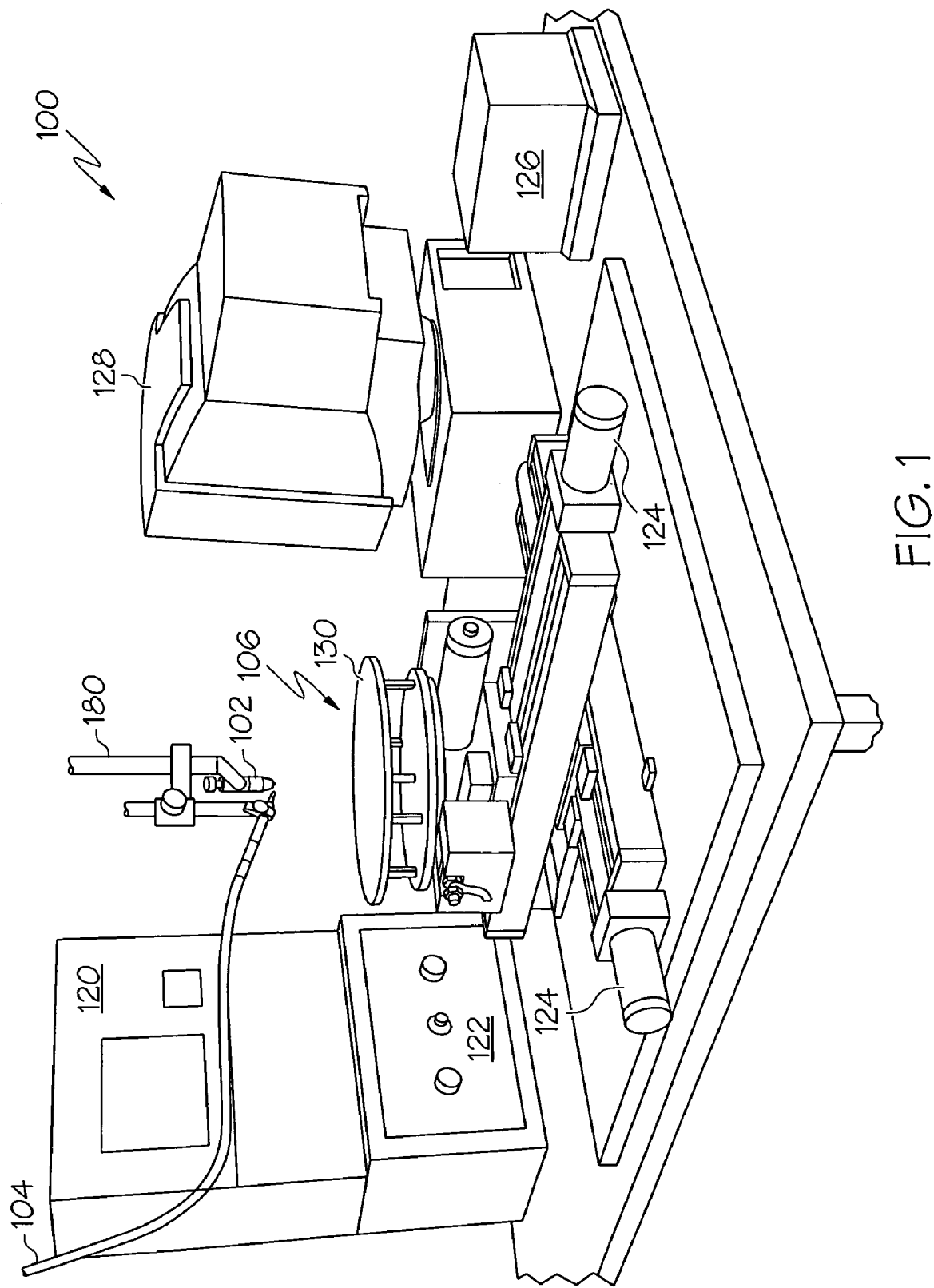
FIG. 1 is a perspective view of an IFF system according to an embodiment of the invention.

FIG. 1 is a perspective view of an IFF system 100, which includes a heating torch 102 that functions in cooperation with a wire feed mechanism 104 and a positioning system 106 to build up a workpiece in a continuous or layer-by-layer manner. The positioning system 106 continuously positions and repositions the workpiece in a manner whereby feedstock material may be added to it through the wire feed mechanism 104 at predetermined deposition points. Further, the positioning system 106 may also be configured to coordinate movement and control of the torch 102 and the wire feed mechanism 104 together with the workpiece to fabricate three-dimensional articles in a predictable, highly selectable, and useful manner. Control of the positioning system 106 may be achieved by computer-implemented control software or the like. The coordinated torch 102, wire feed mechanism 104, and positioning system 106 provide a highly flexible, manually adaptable, and spontaneously constructible automated system through which components may be fabricated to net or near-net shape.

Additional elements depicted in FIG. 1 include a gas controller 120 that controls gas and/or fluid flow to the torch 102, which is preferably a plasma welding torch. A plasma or arc power source 122 supplies the necessary power to the torch 102. Positioners and/or positioning motors 124 are supplied with positioning signals from an electric drive 126 that is coupled to a computer 128 or other controlling device.

Figure 2:
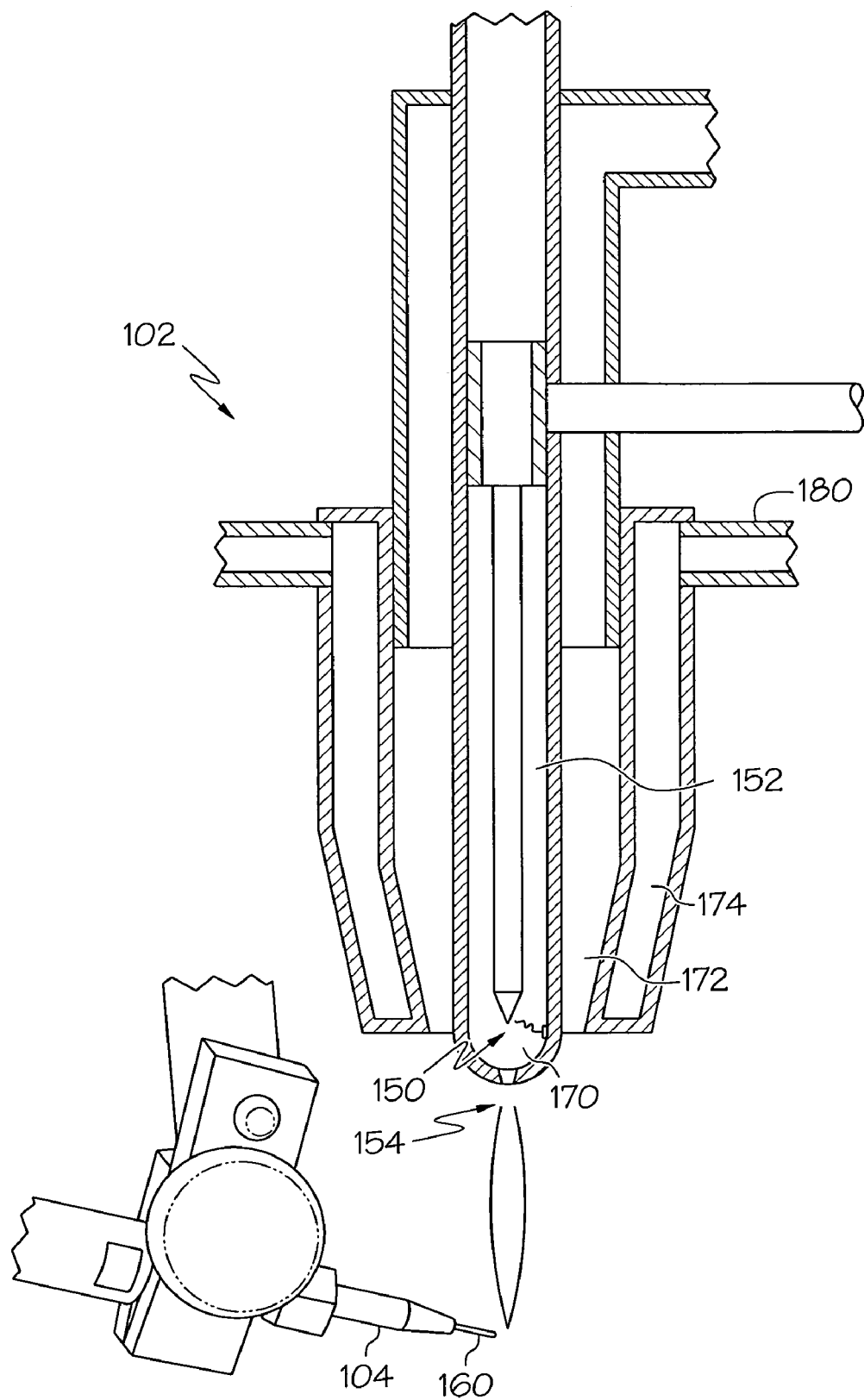
FIG. 2 is a cross-sectional view of a torch from an IFF system, the torch functioning in cooperation with a wire feed mechanism, which is depicted in a perspective view.

A cross-sectional view of the torch 102 is depicted in detail in FIG. 2 in cooperation with a wire feed mechanism 104. An arc electrode 150 is positioned near a nozzle 154 and inside a gas flow channel 152, and operates to ionize a gas and create a hot argon plasma in region 170 before the gas exits the nozzle 154. Upon being energized, the argon gas rapidly accelerates from the nozzle 154 toward the workpiece. The wire feed mechanism 104 introduces feedstock 160 between the nozzle 154 and the workpiece. In an exemplary embodiment, the workpiece is included in an electrical circuit including the ionized gas in order to accelerate and attract the ions from the nozzle 154. The workpiece may be charged by applying a voltage that is opposite of the charge generally present in the ionized plasma gas. The ionized gas is then electrically attracted to the workpiece. Use of such electrical charge in the workpiece may also serve to control the direction and distribution of the ionized plasma gas. The degree of attraction between the ions and the workpiece may be controlled by increasing or decreasing the charge present on the workpiece.

A noble gas such as argon is preferably ionized using the arc electrode 150, although alternative inert gases, ions, molecules, or atoms may be used in conjunction with the torch 102 instead of argon. These alternative mediators of the plasma energy may include positive and/or negative ions, or electrons alone or together with ions. Further, reactive elements may be combined with an inert gas such as argon to optimize performance of the torch 102. The plasma generating process so energizes the argon gas that the gas temperature is raised to between 5,000 and 30,000K. Consequently, only a small volume of energized argon gas is required to melt feedstock 160 from the wire feed mechanism 104. Nozzles of varying apertures or other orifices may be used to provide specific geometry and plasma collimation for the fabrication of different components. Direct beam nozzle orifices may contrast with nozzles having a fan shape or other shapes.

The ionized argon plasma, and all other ionized noble gases, has strong affinity for electrons and will obtain them from the surrounding atmosphere unless the atmosphere consists of gases having equal or higher electron affinity. One advantage of the exemplary IFF system depicted in the drawings does not require a pressurization chamber or other chamber in which the ambient gas is controlled. However, to prevent the ionized argon plasma from obtaining electrons and/or ions from the surrounding atmosphere, i.e. from nitrogen and oxygen typically present in ambient environments, the ionized argon plasma is sheathed or protected by a curtain of helium, another noble gas, or other inert gases flowing from the nozzle from a coaxial channel 172. Helium and other noble gases hold their electrons with a high degree of affinity, and are less susceptible than oxygen or nitrogen to having its electrons taken by the ionized argon plasma.

Collisions between the energetic argon atom and the nozzle 154 may substantially heat and damage the nozzle if left unchecked. To cool the nozzle 154, water or another cooling fluid is circulated in a cooling chamber 174 that surrounds the nozzle 154. A gas and water flow line 180 leads into the cooling chamber 174.

Any material susceptible to melting by an argon ion or other plasma beam may be supplied using a powder feed mechanism or the wire feed mechanism 104 as feedstock 160. Such materials may include steel alloys, aluminum alloys, titanium alloys, nickel alloys, although numerous other materials may be used as feedstock depending on the desired material characteristics such as fatigue initiation, crack propagation, post-welding toughness and strength, and corrosion resistance at both welding temperatures and those temperatures at which the component will be used. Specific operating parameters including plasma temperatures, build materials, melt pool parameters, nozzle angles and tip configurations, inert shielding gases, dopants, and nozzle coolants may be tailored to fit an IFF process. U.S. Pat. No. 6,680,456 discloses an IFF system and various operating parameters, and is hereby incorporated herein by reference.

As previously discussed, one inherent challenge when building a component using an IFF process is establishing and maintaining a heat balance between the weld pool, the torch, and the substrate. An IFF process may only enable the fabrication of a component if the freezing rate of molten material is precisely controlled. The torch melts the feedstock, which briefly forms a molten pool on the underlying component material, if any is present. The torch may also melt a small portion of the substrate to further form a molten pool. Alternatively, the molten feedstock introduced into the plasma stream is sufficiently hot to quickly melt a small amount of underlying component material, if any is present. The material in the molten pool may flow away instead of providing additionally built-up structure if the pool does not quickly solidify. However, the material in the pool will add incremental shape to the component if solidification quickly occurs when the molten feedstock stream contacts the underlying substrate or component material.

There are several exemplary elements of an IFF process that may be manipulated to enable precise temperature control of molten feedstock and component material. In an exemplary method, a variable magnitude current and/or voltage, and other electrical parameters are controlled to produce a feedstock stream that quickly solidifies upon contacting the underlying material. Returning briefly to FIG. 2, a current is supplied to the arc electrode 150 to create a hot plasma stream that upon being energized rapidly accelerates from the nozzle 154. According to one embodiment, a variable magnitude current or a variable magnitude voltage will cause the arc electrode to create bursts of hot plasma. The bursts of hot plasma may be produced as part of a hot plasma stream that is cooler than the hot plasma bursts. Alternatively, the variable magnitude current or voltage creates a plasma stream that has a substantially constant temperature.

The wire feed mechanism 104 introduces the feedstock 160 into the plasma stream, and the bursts of hot plasma produce drops of molten feedstock that are sized and heated to quickly solidify in a predetermined amount of time. In an exemplary embodiment, droplets are sized and heated to have sufficient surface tension to practically maintain a ball shape upon impact with the substrate so they can build on the substrate instead of flowing thereon. Alternatively, the bursts of hot plasma are sufficiently hot or are so closely spaced apart in time that they produce a stream of molten feedstock, instead of separate drops, that quickly solidifies in a predetermined amount of time.

The variable magnitude current may be manipulated in numerous exemplary ways to produce a tailored plasma stream, depending on predetermined factors including an optimal molten feedstock temperature, an optimal feedstock stream rate at which a predetermined amount of molten feedstock material is produced when introducing the feedstock material into the plasma stream, an optimal feedstock droplet size, and an optimal pool size for the pool of molten feedstock. Some ways to adjust the variable magnitude current include adjusting the voltage and/or amperage magnitudes, adjusting the amplitude duration within a cycle, and adjusting the current frequency.

Figure 3:
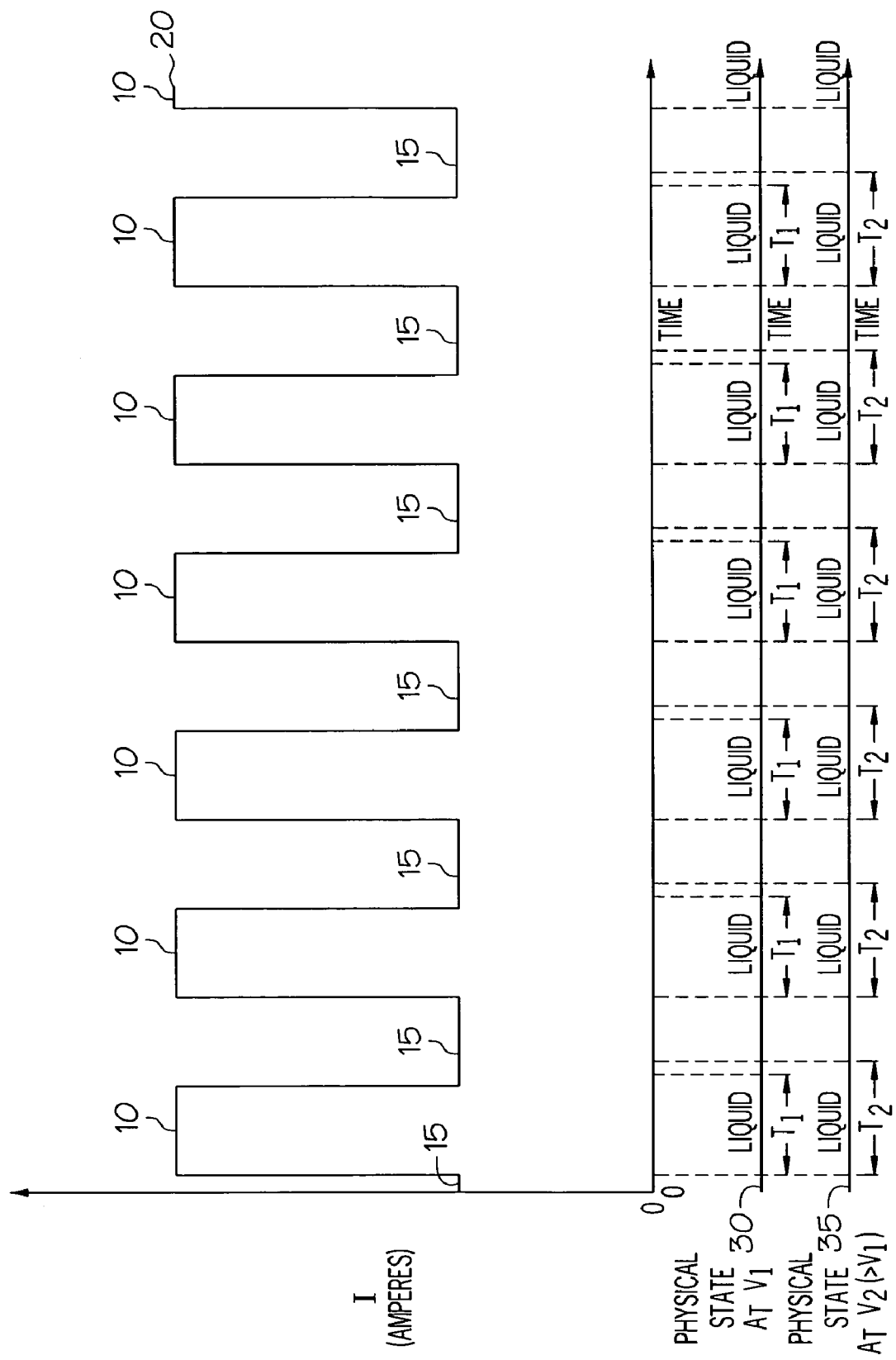
FIG. 3 is a graph that depicts a variable magnitude current and correlates the current with feedstock phases when the feedstock is melted using a torch that is powered at two separate voltages.

FIG. 3 is a graph that depicts an exemplary variable magnitude current and correlates the current with feedstock phases when the feedstock is melted using a torch 102 that is powered by a variable magnitude current produced from two separate voltages according to exemplary methods. The exemplary current 20 corresponds with a voltage $V_1$ has a stepped profile, although other wave shapes may be provided, and alternates between high amperage 10 and low amperage 15. Below the current graph is a time continuum 30 that correlates the exemplary current with a feedstock phase during an IFF process. The feedstock may be a metal, ceramic material, polymer, or other material suitable for deposition by IFF. As illustrated, the feedstock melts to a liquid phase and deposits onto a substrate or previously-deposited material at or shortly after the current 20 is supplied at high amperage 10. The feedstock continues to be deposited until or shortly after the current 20 is supplied at low amperage 15.

In one exemplary embodiment, the duration $T_1$, at which the feedstock is in a liquid phase is only long enough to form a small feedstock droplet that is sized to solidify in a predetermined amount of time. The high amperage 10 may be supplied for a duration that produces a droplet that solidifies before another droplet reaches the substrate or previously-deposited material. Alternatively, the high amperage may be supplied for a duration that produces a droplet into or adjacent to a molten pool produced by the previous droplet. In another embodiment, the duration $T_1$ at which the feedstock is in a liquid phase is sufficiently long to provide a stream of melted feedstock. For any of these embodiments, the molten pool produced by the droplets or stream solidifies before the pool has time to flow to an extent at which successive component layers can not be formed.

Below the time continuum 30 is another continuum 35 that corresponds to a voltage $V_2$ that is higher than the voltage $V_1$. Although the current 20 is unchanged, the duration $T_2$ at which the feedstock is in a liquid phase is longer than $T_1$, since the increased voltage $V_2$ causes the feedstock to reach a higher temperature and to therefore stay in liquid phase for a longer duration than $T_1$. The depicted times $T_1$, and $T_2$ are merely examples, and may be of a duration that is much longer than the time at which the current 20 has a high amperage 10. For instance, if a stream of molten feedstock is being produced instead of individual droplets, the continuous supply of melted feedstock to the molten pool may cause initially-deposited feedstock to remain liquid for a relatively long period of time as long as the molten pool solidifies before it can flow off of the previously formed feedstock layers.

As previously discussed, in addition to adjusting the voltage there are other exemplary methods for manipulating a variable magnitude current to create molten feedstock pools, streams, and/or droplets having optimal sizes, stream rates, or temperatures. In addition, there are numerous exemplary ways to manipulate the manner in which feedstock is introduced into the plasma stream to molten feedstock pools, streams, and/or droplets having optimal sizes, stream rates, or temperatures. For example, the feedstock feed rate may be adjusted to introduce smaller or larger amounts of feedstock into a hot plasma stream. Larger amounts of feedstock will create a relatively large droplets and stream rates, translating to a large melt pool that may take a relatively long duration to solidify. Further, the feedstock feed rate may be pulsed between fast and slow rates, or even stopped and started, to introduce the feedstock into the plasma stream in a pulsed manner. The pulsed feedstock feed rate may even be performed in concert with high and low amplitudes in the variable magnitude current.

As another example, the relative velocity of the torch 102 and the substrate and/or component may be adjusted during the IFF process. A relatively high velocity will cause a given amount of melted feedstock to be spread over a larger area. Consequently, the feedstock will solidify more quickly and have relatively small melt pools than if the melted feedstock was able to accumulate in a smaller area due to relatively low velocity between the torch 102 and the substrate and/or component. As previously discussed, these and other adjustments to the IFF process may be performed based on determinations pertaining to a desirable molten feedstock temperature, a desirable molten feedstock pool size, or a desirable molten feedstock stream rate and/or droplet size.

Thus, the IFF methods of the present invention include various mechanisms for improving temperature control for the molten feedstock material and/or underlying molten component material when heated feedstock is deposited onto a targeted surface to build the component. The methods can be implemented without adding major hardware components to existing IFF systems.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An ion fusion formation method for manufacturing a component from successive layers of feedstock material, with each of the successive layers representing a cross-sectional component slice, the method comprising:

determining optimal molten feedstock temperatures to form the successive layers;

creating a plasma stream by energizing a flowing gas using an arc electrode, the arc electrode having a variable magnitude current supplied thereto;

directing the plasma stream to a predetermined targeted region; and introducing the feedstock material into the plasma stream to produce a pool of molten feedstock in the predetermined targeted region, the molten feedstock being produced at a temperature determined in part by parameters of the variable magnitude current; and adjusting the variable magnitude current supplied to the arc electrode to bring the feedstock material to the optimal temperatures when introducing the feedstock material into the plasma stream.

2. The method of claim 1, wherein adjusting the variable magnitude current comprises adjusting a condition selected from the group consisting of voltage magnitude, an amperage magnitude, a current amplitude duration, and a current frequency.

3. The method of claim 1, further comprising:

adjusting the rate at which the feedstock material is introduced into the plasma stream to bring the feedstock material to the optimal temperatures.

4. An ion fusion formation method for manufacturing a component from successive layers of feedstock material, with each of the successive layers representing a cross-sectional component slice, the method comprising:

creating a plasma stream by energizing a flowing gas using an arc electrode, the arc electrode having a variable magnitude current supplied thereto;

directing the plasma stream to a predetermined targeted region; and introducing the feedstock material into the plasma stream to produce a pool of molten feedstock in the predetermined targeted region, the molten feedstock being produced at a temperature determined in part by parameters of the variable magnitude current;

determining an optimal feedstock stream rate at which a predetermined amount of molten feedstock material is produced when introducing the feedstock material into the plasma stream; and adjusting the variable magnitude current supplied to the arc electrode to produce the optimal feedstock stream rate.

5. The method of claim 4, wherein adjusting the variable magnitude current comprises adjusting a condition selected from the group consisting of voltage magnitude, an amperage magnitude, a current amplitude duration, and a current frequency.

6. The method of claim 4, further comprising:

adjusting the rate at which the feedstock material is introduced into the plasma stream to produce the optimal feedstock stream rate.

7. The method of claim 4, further comprising:

determining an optimal feedstock droplet size to produce the pool of molten feedstock; and adjusting the variable magnitude current supplied to the arc electrode to produce the optimal feedstock droplet size when introducing the feedstock material into the plasma stream.

8. The method of claim 7, wherein adjusting the variable magnitude current comprises adjusting a condition selected from the group consisting of voltage magnitude, an amperage magnitude, a current amplitude duration, and a current frequency.

9. The method of claim 7, further comprising:

adjusting the rate at which the feedstock material is introduced into the plasma stream to produce the optimal feedstock droplet size.

10. An ion fusion formation method for manufacturing a component from successive layers of feedstock material, with each of the successive layers representing a cross-sectional component slice, the method comprising:

creating a plasma stream by energizing a flowing gas using an arc electrode, the arc electrode having a variable magnitude current supplied thereto;

directing the plasma stream to a predetermined targeted region; and introducing the feedstock material into the plasma stream to produce a pool of molten feedstock in the predetermined targeted region, the molten feedstock being produced at a temperature determined in part by parameters of the variable magnitude current;

determining an optimal pool size for the pool of molten feedstock; and adjusting the variable magnitude current supplied to the arc electrode to produce the optimal pool size.

11. The method of claim 10, wherein adjusting the variable magnitude current comprises adjusting a condition selected from the group consisting of voltage magnitude, an amperage magnitude, a current amplitude duration, and a current frequency.

12. The method of claim 10, further comprising:

adjusting the velocity between a point at which the feedstock material is introduced into the plasma stream and the predetermined targeted region to produce the optimal pool size.

13. The method of claim 10, further comprising:

adjusting the rate at which the feedstock material is introduced into the plasma stream to produce the optimal pool size.

14. An ion fusion formation method for manufacturing a component from successive layers of feedstock material, with each of the successive layers representing a cross-sectional component slice, the method comprising:

creating a plasma stream by energizing a flowing gas using an arc electrode; directing the plasma stream to a predetermined targeted region;

determining optimal molten feedstock parameters for producing the layers of feedstock material;

adjusting feeding parameters by which the feedstock material will be introduced into the plasma stream in view of the determined optimal molten feedstock parameters; and introducing the feedstock material into the plasma stream by pulsing the feedstock feed rate between fast and slow rates to produce a pool of molten feedstock in the predetermined targeted region, the molten feedstock being produced having the determined optimal parameters.

15. The method of claim 14, wherein the molten feedstock parameters include at least one parameter selected from the group consisting of molten feedstock temperature, molten feedstock stream rate, molten feedstock droplet size, and the size of the pool of molten feedstock.

16. The method of claim 14, wherein the feedstock material is introduced into the plasma stream by starting and stopping introduction of the feedstock material into the plasma stream.

* * * * *